No. 742,962. PATENTED NOV. 3, 1903.
N. K. BOWMAN.
SIGNAL SYSTEM FOR MINES.
APPLICATION FILED FEB. 21, 1903.
NO MODEL. 2 SHEETS—SHEET 1.
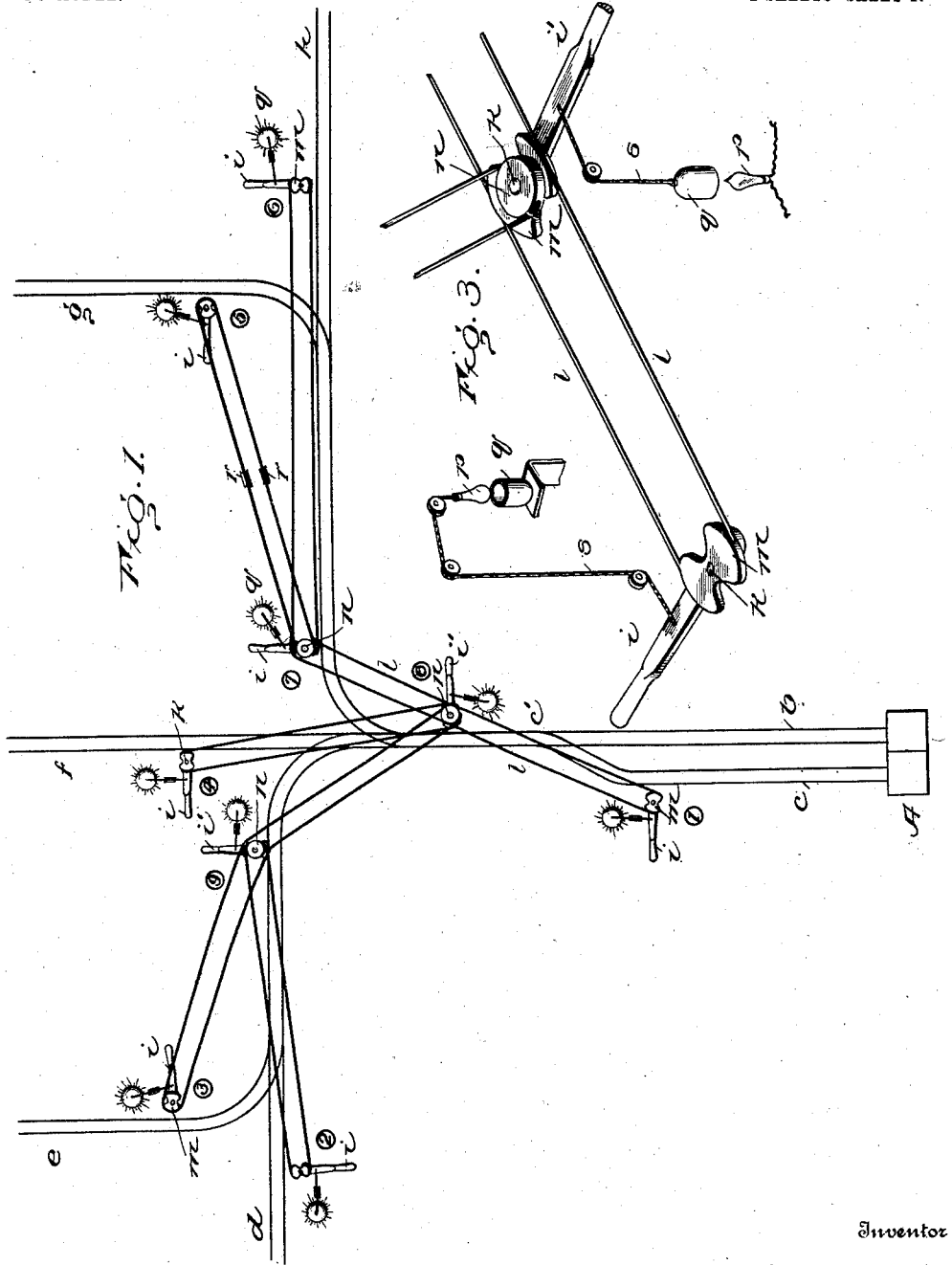
Inventor
Newton K. Bowman.
Witnesses

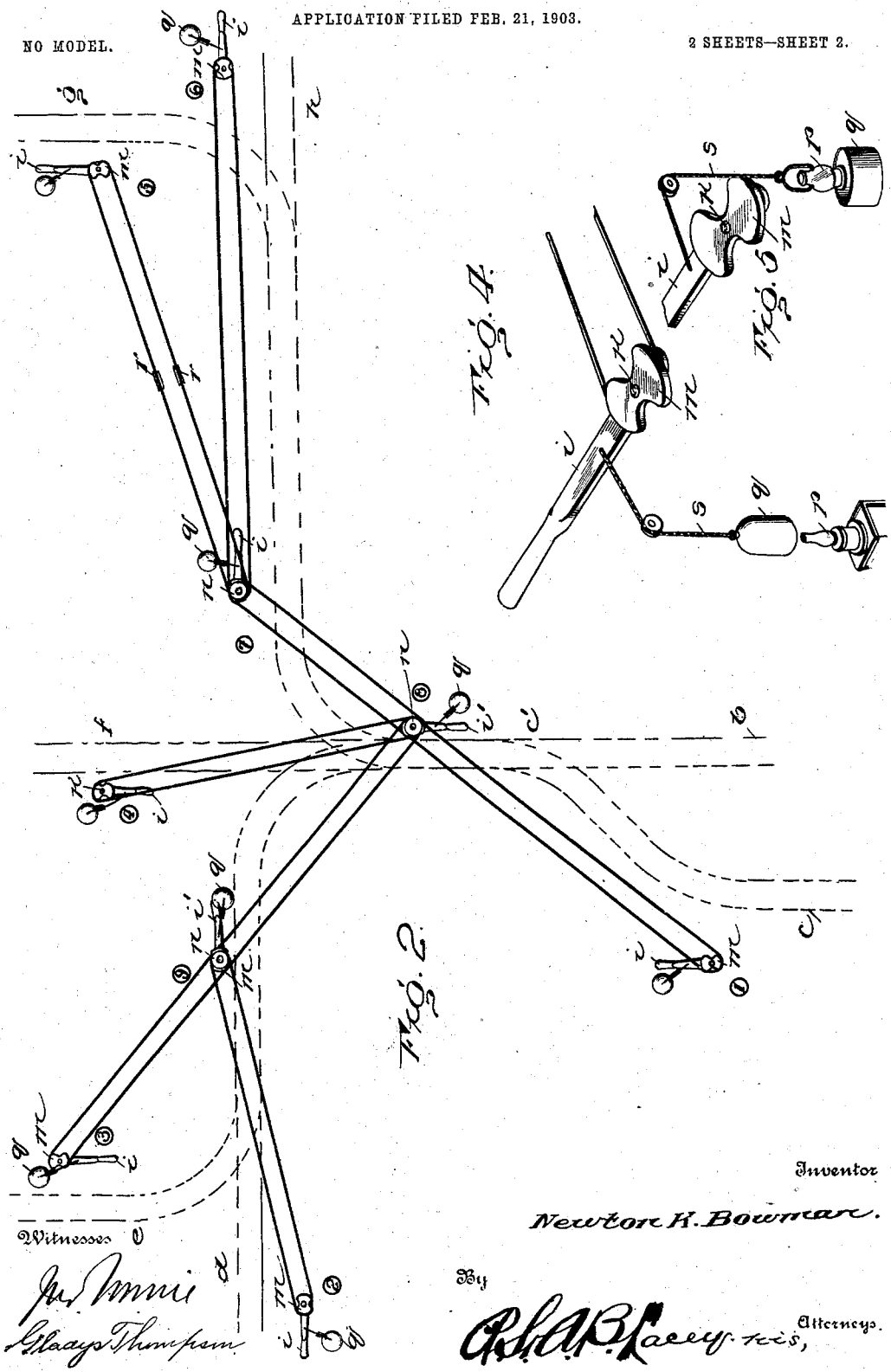

No. 742,962. Patented November 3, 1903.

UNITED STATES PATENT OFFICE.

NEWTON K. BOWMAN, OF NORTH LAWRENCE, OHIO.

SIGNAL SYSTEM FOR MINES.

SPECIFICATION forming part of Letters Patent No. 742,962, dated November 3, 1903.

Application filed February 21, 1903. Serial No. 144,508. (No model.)

*To all whom it may concern:*

Be it known that I, NEWTON K. BOWMAN, a citizen of the United States, residing at North Lawrence, in the county of Stark and State of Ohio, have invented certain new and useful Improvements in Signal Systems for Mines, of which the following is a specification.

In coal and other mines wherein tracks are laid in the numerous galleries or entries for passage of cars carrying the coal or other material mined to the shaft for transportation to the surface many collisions occur at the junctions of the tracks and between the junctions through the lack of a suitable signal system whereby the driver of a car running from one track onto another may signal throughout all the entries that the way is closed and having passed the last junction-point again signal the way is open, and much loss of time is occasioned by reason of the fact that the driver when arriving at a junction is obliged to stop his car and run ahead to see that no car is running on the connecting-track before he can proceed. In order to avoid this latter objection, boys have been stationed at the junctions to watch the cars as they come through the different entries and signal the drivers; but even when the most careful and painstaking preliminary investigation is made by the driver or signal-boy, and the latter is often careless and inattentive to duty, the driver cannot proceed with any degree of certainty that the way is clear, as in many instances the entries are crooked or tortuous, the view of the entries shut off by gates placed across the tracks to control the air-currents, the junctions so far apart, and the other incidental impediments to sight and hearing so great as to render it difficult for the driver or signal-boy to see or hear the approach of a car on an adjoining track. For these and other reasons collisions between cars at or between junctions and on the main track under the present methods are unavoidable and of frequent occurrence, and in these collisions a large number of draft-animals are killed and injured. If through any means a collision is avoided between cars running in opposite directions on the main track or on a branch track between junctions, considerable difficulty is involved in running one car back to a junction to make way for the other and valuable time lost by the blocking up of the track.

The object of my invention is to provide a simple and reliable signal system for mines which will obviate the difficulties and objections above noted by simultaneously indicating throughout all the entries whether the way is open or closed for passage of a car to or from the shaft and by means of which the driver of a car approaching any one of the junctions and finding the way clear may signal as he passes onto the connecting-track that the way is closed and having arrived at or near his destination again signal that the way is open, whereby all liability of collision is entirely avoided.

With this and other objects in view the invention consists in certain novel features of construction, combination, and arrangement of parts, which will be hereinafter more fully described, and particularly pointed out in the appended claims.

In the accompanying drawings, forming a part of this specification, Figure 1 is a diagrammatic view showing the arrangement of my invention with respect to the main and branch tracks of a mine and the signal levers and lights thereof as arranged to indicate that the way is closed. Fig. 2 is a similar view showing the levers and lights moved to indicate that the way is open. Fig. 3 is a detail perspective view of two of the signal levers, lights, and connections, showing the manner of connecting the branch wires when they extend at an angle to the main wires. Fig. 4 is a perspective view of a closing-lever and stationary light. Fig. 5 is a perspective view of a closing-lever and movable light.

Referring now more particularly to the drawings, wherein like numerals and letters of reference designate corresponding parts throughout the several views, A represents the mine-shaft; c, a shunt-track running into the main track at c' and on which the empty cars travel back to the works, said tracks being laid in the main entry, and d, e, f, g, and h the branch tracks connecting with each other and the main track and leading down through the several entries or galleries of the mine.

The numerals 1 to 9, inclusive, represent signal-stations arranged near the junctions of the tracks with each other, and at each of these stations is located a hand signal-lever, the levers at stations 1 to 6, inclusive, being denoted by the letter $i$ and the levers at stations 7 to 9, inclusive, by the letter $i'$. These levers constitute visual signals and may be arranged vertically or horizontally, as desired, and pivotally secured in any approved manner to the wall or roof of the mine-entry. In the present instance I have shown the levers arranged horizontally and mounted at a distance from their handle ends and adjacent to their opposite ends upon pivot-bolts $k$, which are adapted to be secured to the roof of the mine-entry. In Fig. 1 the levers are shown arranged at right angles to their respective entries and tracks to indicate that a car is running along the main track or one of the branch tracks between the junctions and the way is closed, while in Fig. 2 they are shown turned in a direction parallel with the tracks to indicate that the way is open for the passage of a car in either direction on the main track or on either branch track between the junctions. The levers are connected with each other to move in unison by any suitable means, as wires $l$, which on long stretches are in practice preferably supported by friction-rollers $r$ to prevent sagging and insure ease of operation, each lever being connected with an adjoining lever by a pair of parallel wires $l$, secured on opposite sides of the pivotal points thereof, so that when one lever is moved to indicate that the way is open or clear the other levers will be moved correspondingly, and vice versa. When the levers are arranged at a right angle, or substantially so, to the levers with which they are connected, as is the case of the levers $i$ at stations 3 and 5, segments $m$, mounted to turn therewith, are provided for attachment of the wires thereto, and when the levers have two connections, as in the case of the levers $i'$ at stations 7, 8, and 9, pulleys are provided for attachment of one pair of wires, as shown. The levers at stations 1 to 6, inclusive, which are located at the junctions of the shunt-track with the main track and the branch entry-tracks with each other, may be properly denominated "closing-levers," and the levers at stations 7 to 9, inclusive, located at the junctions of the branch tracks with the main track may, on the other hand, be properly denominated "opening-levers" in order to avoid confusion in describing the operation of the parts.

The operation is as follows: As before stated, the loaded cars run on main track $b$ to discharge at the shaft, and the empty cars return on track $c$. When an empty car starts from one of the entries—the entry $f$, for instance—the driver moves the closing signal-lever $i$ at station 1 to the closed or danger position to indicate at the junctions of all the entries that the way is closed. When he arrives at station 8, he continues his course, but moves the opening-lever $i'$ at that station to the safety or open position, thus opening all entries, because it is evident that he can easily arrive safe in his own entry before a car can meet him coming from either of the other entries $d$, $e$, $g$, or $h$. If a driver for entry $h$ follows the driver for entry $f$, he also moves the signal-lever at station 1 to the danger position and when he arrives at station 7 moves the signal-lever there to the safety position, as he being on the move can pass the junction before a car which has been waiting at station 5 could meet him. The drivers for entries $d$ and $e$ on going in empty operate the signal at station 1 in like manner, but operate the opening-lever at station 9 to signal "safe" and "open" all the entries. When a driver from entry $h$ starts out with a loaded car for the shaft, he does not stop when arriving at station 6 unless the signal indicates that the way is closed, but moves the signal-lever to the closed position and keeps on until he arrives at station 7, when he moves the signal-lever to the open position, because no driver who might have been waiting at station 2, 3, or 4 could start his trip and meet him at the junction, nor could a driver with an empty trip on track $c$ start his trip before the said driver from entry $h$ could arrive safely on the main track $b$. Similarly the driver from entry $f$ signals "open" at station 8, and the drivers from entries $d$ and $e$ signal "open" at station 9. It will thus be seen that by means of my invention a driver arriving at a junction may ascertain instantly and with certainty whether the way is open or closed and having ascertained that it is open may signal and hold any other car that may thereafter arrive at any of the other junctions until he arrives safely at his destination; also, that a saving of time is effected, for the reason that the driver is not obliged to stop his car at the junctions along the route and run ahead to see if the way is clear and start his car again, wait while this duty is being performed by the signal-boys, or to proceed slowly and cautiously on the constant outlook for other cars, but may travel at full speed along the entire route. Moreover, owing to the safety and rapidity of travel insured by my invention the driver of a car waiting at any one of the junctions for right of way will be detained but a short time. The provision of the "opening" signal-stations intermediate the branch-track junctions is also of importance, as the driver having the right of way is enabled to signal with safety throughout all the entries that the way is open for passage of other cars, so that a car waiting at either one of the junctions may attain a full start without delay.

To add to the efficiency of the system, lights are included therein and are exposed to indicate "danger" and shaded when the track is clear. These lights may be a lantern, an electric lamp, or other type and are shown at $p$. A shade cover or housing $q$ coöperates with the lights to conceal them when desired, as when the track is clear. The lights may be stationary or the shades movable, as shown in Fig. 4 and at the right hand of Fig. 3, or the shades may be stationary and the lights movable, as indicated in Fig. 5 and at the left hand of Fig. 3. The movable part $p$ or $q$ is connected to the operating-lever by a cord $s$ or like part, the same passing over direction-pulleys. The lights may be suspended from the roof or located in any desired position.

It will of course be understood that changes in the form, arrangement, and minor details of construction may be made within the scope of the invention without departing from the spirit or sacrificing any of the advantages thereof.

Having thus described the invention, what is claimed as new is—

1. In a signaling system for mines, the combination with a plurality of branch tracks running in different directions and connecting at different points and leading into a main track, of levers located at the several junctions and constituting visual signals and operating-handles for the system and adapted to be manually operated to indicate by their position safety or danger, and connections between the levers to cause them to operate in unison, some of the connections leading from an intermediate station to several of the stations, substantially as set forth.

2. In a signaling system for mines, the combination with a main and a shunt track, and a series of branch tracks running in various directions, some of the branch tracks communicating with other branch tracks and all leading into the main track, of manually-operated levers located at the junctions of all the different tracks and constituting visual signals and operating-handles for the system, and parallel wires connecting adjacent levers at points equidistant from their fulcra to cause a simultaneous movement of all the levers of the system upon actuating any one, substantially as described.

3. In a signaling system for mines, the combination with a main and a shunt track, and a series of branch tracks running in various directions, some of the branch tracks communicating with other branch tracks and all leading into the main track, of manually-operated levers located at the junctions of all the different tracks and constituting visual signals and operating-handles for the system, cross-bars applied to some of the levers to turn therewith and having an angular disposition with reference thereto, and parallel wires connecting the levers and cross-bars in series, substantially as and for the purpose described.

4. In a signaling system for mines, the combination with a plurality of branch tracks running in different directions and connecting at different points and leading into a main track, of levers located at the several junctions and constituting visual signals and operating-handles for the system and adapted to be manually operated to indicate by their position safety or danger, connections between the levers to cause them to operate in unison, some of the connections leading from an intermediate station to several of the stations, and signal-lights connected with the respective levers for coördinate coöperation therewith, substantially as described.

5. In a signaling system for mines, the combination with a plurality of branch tracks running in different directions and connecting at different points and leading into a main track, of levers located at the several junctions and constituting visual signals and operating-handles for the system and adapted to be manually operated to indicate by their position safety or danger, connections between the levers to cause them to operate in unison, some of the connections leading from an intermediate station to several of the stations, signal-lights and shades coöperating with the levers, one of the parts being movable and connected with the respective levers to expose or conceal the lights, substantially as described.

In testimony whereof I affix my signature in presence of two witnesses.

NEWTON K. BOWMAN. [L. S.]

Witnesses:
P. D. POLLOCK,
JOHN POLLOCK.